United States Patent [19]

Krüger et al.

[11] Patent Number: 5,422,049
[45] Date of Patent: Jun. 6, 1995

[54] METHOD AND APPARATUS FOR THE PLASTIFYING OF SYNTHETIC RESINS

[75] Inventors: Ernst Krüger, Georgsmarienhütte, Germany; Helmut Habisohn, Leopoldsdorf, Austria

[73] Assignee: Friedrich Theysohn GmbH, Langenhagen, Germany

[21] Appl. No.: 149,181

[22] Filed: Nov. 8, 1993

[51] Int. Cl.⁶ .................... B29B 7/82; B29C 47/78
[52] U.S. Cl. .................... 264/26; 264/211.23; 264/349; 264/DIG. 46; 425/174.8 E; 425/205; 425/208; 425/DIG. 13
[58] Field of Search ............ 264/25, 26, 211.23, 264/349, DIG. 46; 425/174.8 E, 174.8 R, 204, 205, 208, DIG. 13

[56] References Cited

U.S. PATENT DOCUMENTS

| | | | |
|---|---|---|---|
| 2,353,362 | 7/1944 | Rudd | 425/174.8 |
| 2,505,602 | 4/1950 | Bertrand | 425/174.8 |
| 3,129,459 | 4/1964 | Kullgren et al. | 425/174.8 |
| 4,546,226 | 10/1985 | Trembley et al. | 425/174.8 E |
| 5,145,694 | 9/1992 | Brams | 264/26 |

*Primary Examiner*—Mathieu D. Vargot
*Attorney, Agent, or Firm*—Herbert Dubno

[57] ABSTRACT

A method of thermoplastifying a synthetic resin which is displaced by a worm in a worm housing. High-frequency energy is applied to the plastic in one or more regions along the path of the plastic in which there is no or little frictional heat generated by the interaction of the screw with the housing.

8 Claims, 4 Drawing Sheets

METHOD AND APPARATUS FOR THE PLASTIFYING OF SYNTHETIC RESINS

FIELD OF THE INVENTION

Our present invention relates to a method of and to an apparatus for the thermoplastifying of synthetic resins, especially thermoplastics and, more particularly, to a process for the plastifying of a synthetic resin in conjunction with the displacement of the synthetic resin in a worm or screw extruder, especially for extrusion of the synthetic resin or preparation of a plastified synthetic resin for injection molding purposes.

BACKGROUND OF THE INVENTION

Reference to plastification and thermoplastification of a thermoplastic synthetic resin is intended to indicate that the resin, generally originally provided in a particulate form, is subjected to mechanical action including shear and mixing, which, in conjunction with a heating operation results in a melting of the resin so that the thermoplastic synthetic resin is in a molten or liquified state, is substantially homogeneous and, if desired, can be freed from volatile components.

As described in DE-OS 40 24 070, the heating can be applied in part by high-frequency heating while the synthetic resin is subjected to pressure and shear in the worm-type extruder.

In general, the thermoplastification of a thermoplastic synthetic resin utilizes heat generated at least in part by friction between the screw and the screw housing, as well as joule heat resulting from the agitation of the synthetic resin, friction between the synthetic resin and the screw or worm, and friction between the synthetic resin and the housing.

The shear forces which are produced in addition to the compression forces, also contribute to the heating of the synthetic resin which leads to this conversion into a molten state. When that heat is insufficient, additional heating can be provided and it is not uncommon, therefore, for the housing or the screw to be heated. The high-frequency heating described in DE-OS 40 24 070 provides an additional contribution to the heating of a synthetic resin when the mechanically-produced heating is insufficient.

In this high-frequency heating method, the housing and the screw constitute respective electrodes across which the high-frequency field is applied so that the thermoplastic synthetic resin is dielectrically heated. The synthetic resin is thus heated substantially over the entire length of the worm housing.

The apparatus for carrying out this method is expensive and complex to construct and operate, not the least because special insulation is generally required. Furthermore, control of the heating process may not be fully satisfactory because heat may be contributed to the synthetic resin at regions at which mechanical heating may be more pronounced, thereby possibly resulting in overheating of the thermoplastic.

OBJECTS OF THE INVENTION

It is, therefore, the principal object of the present invention to provide an improved method of thermoplastifying a synthetic resin whereby the drawbacks of earlier systems are avoided, especially in the case of high-frequency heating.

Another object of this invention is to provide a method of heating a synthetic resin in a worm or screw-type extruder or plastifying apparatus which allows better control of the heating process.

Still another object of this invention is to provide an improved apparatus for carrying out the process of the invention.

SUMMARY OF THE INVENTION

These objects and others which will become apparent hereinafter are attained, in accordance with the invention by a method in which the thermoplastic synthetic resin is displaced in a worm-type extruder having at least one screw and a housing receiving the screw formed with an inlet for the synthetic resin to be thermoplastified at one end and an outlet for the thermoplastified synthetic resin at an opposite end.

According to the invention, the heating of the synthetic resin is effected by the application of high-frequency energy in limited regions in which there is substantially no friction heat contributed to the synthetic resin by the interaction of the screw and the screw housing i.e., regions that are free from screw flights.

With the process of the invention, therefore, an additional heating of the synthetic resin beyond that which may result mechanically in the displacement of the synthetic resin by the screw, is effected only at locations at which there is no elevated heating by friction. As a consequence, the electrodes which are used to produce the high-frequency fields can be formed very simply. Preferred regions for heating include an intake or inlet region of the extruder in which the supplied synthetic resin can be preheated, an outlet region of the extruder at which the additional heating by high frequency can result in a homogeneous melt, and optionally, one or more intermediate regions.

A simple arrangement can be provided without excessive insulation between the electrodes when the electrodes are mounted in a circular array. The electrodes of opposite polarity are preferably disposed opposite one another. When a plurality of pairs of such electrodes are provided, a circulating high-frequency field can be formed.

According to another feature of the invention, in a decompression region of the plastifying apparatus, we can provide an electrode arrangement for generating a high-frequency field.

Furthermore, the high-frequency field may be a pulsating high-frequency field.

The electrodes may be of segmental shape.

More particularly, the method of thermoplastifying a thermoplastic synthetic resin can comprise the steps of:

(a) introducing a thermoplastifiable thermoplastic synthetic resin through an inlet region into an elongated screw housing containing at least one rotatable screw and advancing the synthetic resin along the housing through at least one intermediate region to a outlet region thereof by rotation of the screw;

(b) heating the synthetic resin by high frequency; and (c) limiting high frequency heating of the synthetic resin to at least one of the regions and at which there is substantially no friction between the screw and the housing.

The method of operating an extruder for extruding a body or strand of the thermoplastic synthetic resin can comprise the steps of:

(a) thermoplastifying a thermoplastic synthetic resin by introducing a thermoplastifiable thermoplastic synthetic resin through an inlet region into an elongated screw housing containing at least one rotatable screw and advancing the synthetic resin along the housing through at least one intermediate region to a outlet region thereof by rotation of the screw;

(b) heating the synthetic resin by high frequency;

(c) limiting high frequency heating of the synthetic resin to at least one of the regions and at which there is substantially no friction between the screw and the housing, thereby thermoplastifying the resin; and (d) forcing the thermoplastified resin through a die.

The apparatus can comprise:

an elongated screw housing containing at least one rotatable screw;

inlet means at one end of the housing forming an inlet region upstream from the housing for feeding the synthetic resin into the housing;

outlet means at an opposite end of the housing for discharging thermoplastified synthetic resin, the thermoplastified synthetic resin being advanced by rotation of the screw from the inlet region through at least one intermediate region to the outlet region, at least one of the regions being substantially free from friction resulting from interaction of the screw and the housing;

at least one pair of spaced apart electrodes disposed at the region; and means for energizing the electrodes with a high frequency electrical field to heat the synthetic resin and plastify the synthetic resin.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
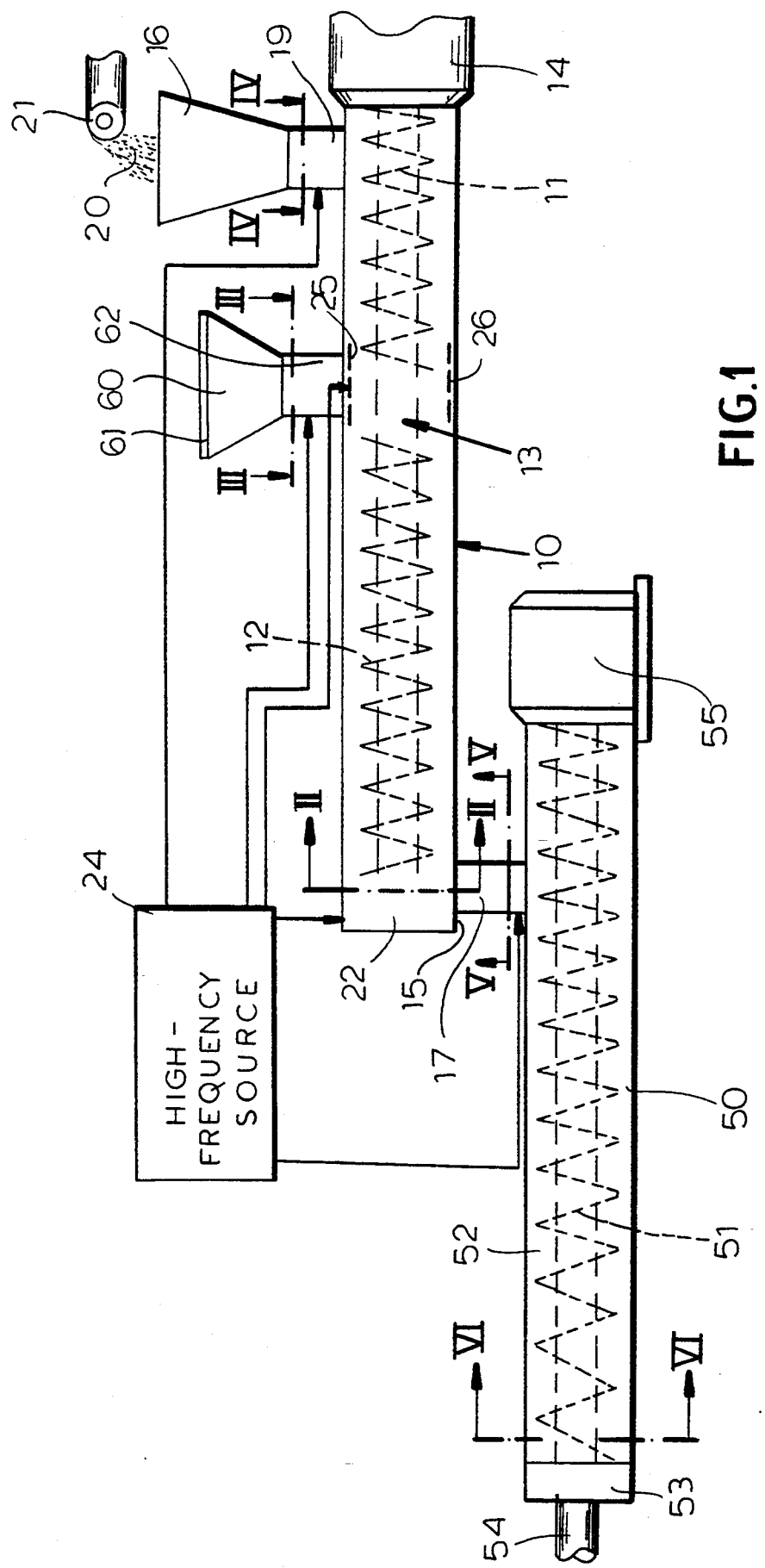
FIG. 1 is a diagrammatic side elevational view of an extruder system for practicing the invention.

In FIG. 1 we have shown an extruder 10 with a worm 11, 12 free from a flight in a decompression zone 13, the worm being driven by a speed-reducing drive mechanism and electric motor represented at 14.

The worm 11, 12 is received in a housing 15 having an inlet funnel 16 at one end of an outlet pipe 17 at its opposite end. A cylindrical segment 19 is provided between the inlet funnel 16 and the housing 15. The granular thermoplastic material 20 can be fed to the funnel 16 by a metering device represented by the belt 21.

As has been shown diagrammatically in the drawing, the fitting 19, the decompression zone 13, an outlet region 22 following termination of the worm 12 or the pipe segment 17 can form regions in which the friction between the worm and the housing is practically negligible and in which electrodes are provided for heating by the application of a high-frequency field from a high-frequency source 24.

For this purpose in the decompression region two opposite electrodes 25, 26 may be provided and may be at opposite polarities and supplied with the pulsed high-frequency electric current.

Other electrode arrangements may be provided as well.

Figure 2:
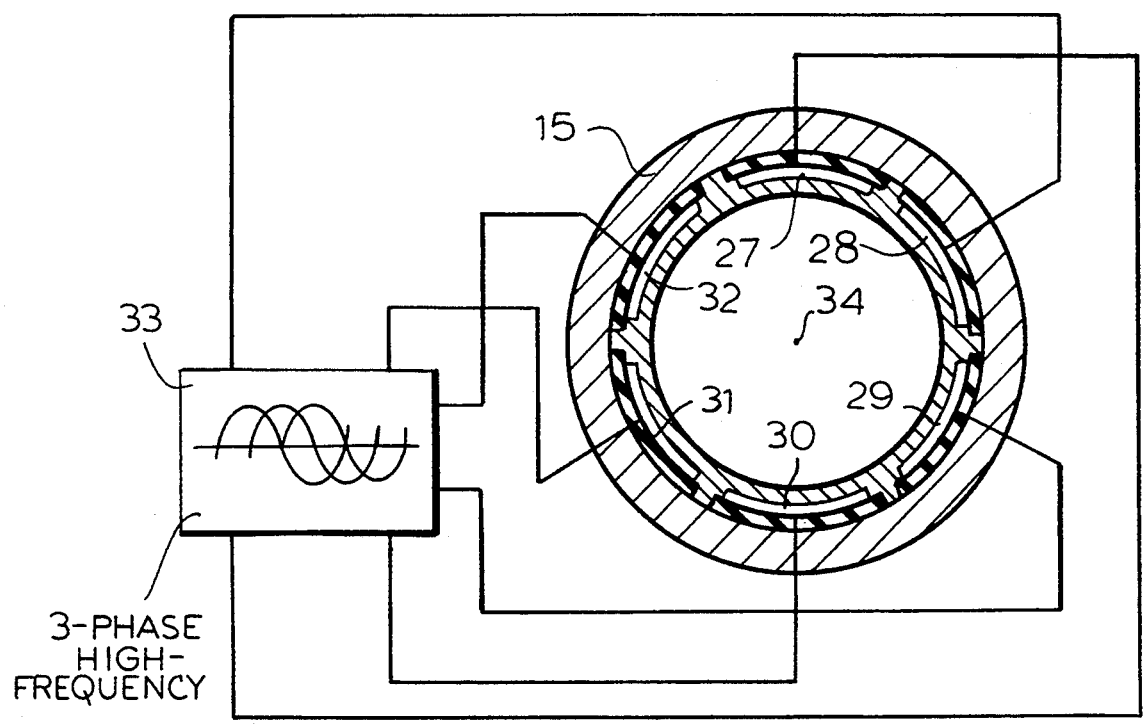
FIG. 2 is a cross sectional view taken along the line II—II of FIG. 1.

For example, in FIG. 2 we have shown a multiplicity of electrodes 27, 28, 29, 30, 31 and 32 which are disposed in a circular array and insulated from the housing 15 at the outlet region 22, the opposing pairs of segmental electrodes 27 and 30, 28 and 31, and 29 and 32, respectively, being energized with opposite polarities by respective phases of a three-phase high-frequency source 33 so that, in effect, the dielectric heating field rotates around the axis field of the housing. At least one pair of the electrodes may be offset from another pair by 120° in this construction.

Figure 3:
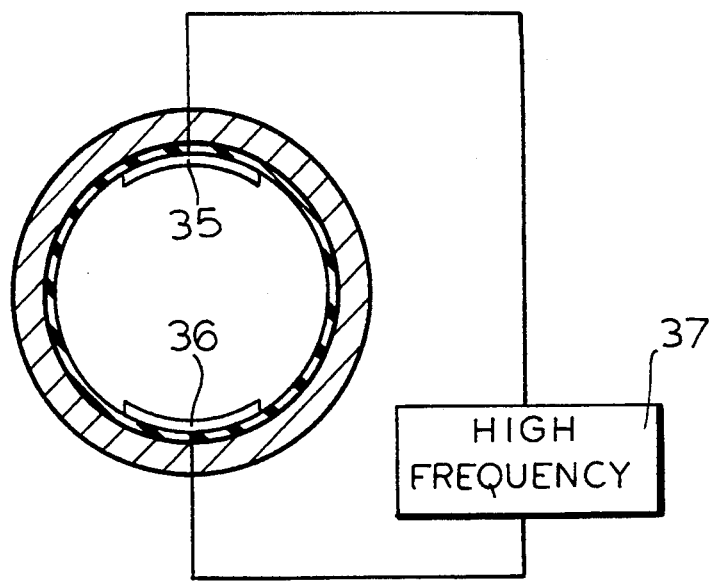
FIG. 3 is a cross sectional view taken along the line III—III of FIG. 1.

In FIG. 3, another arrangement of the segmental electrodes 35 and 36 is provided for energizing by the high-frequency source 37 and once again these opposite polarity electrodes are diposed opposite one another.

Figure 4:
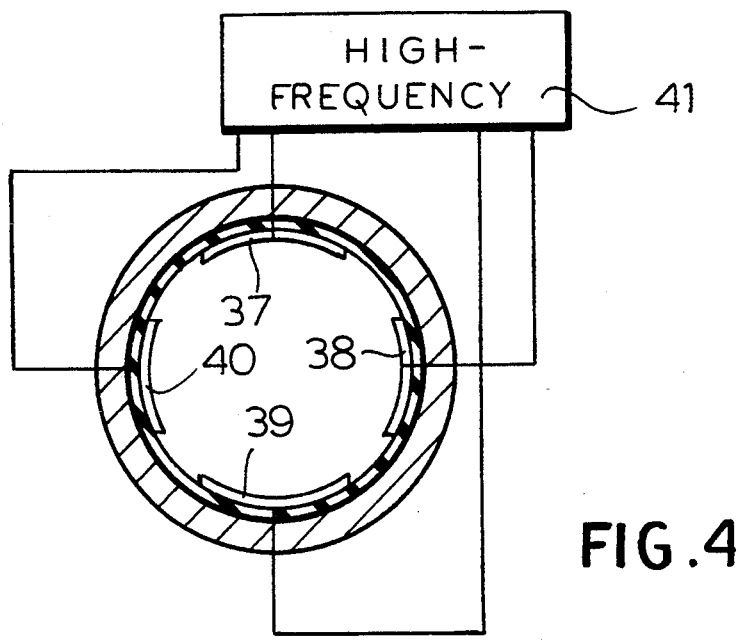
FIG. 4 is a cross sectional view taken along the line IV—IV of FIG. 1.

In FIG. 4, two pairs of electrodes 37, 39 and 38, 40 are provided in diametrically opposite relation and for energization with opposite polarities by the high-frequency source 41. Any of these arrangements can be used for the heating in the pipe 17.

While the die can be provided on the extruder 10, in one advantageous embodiment of the invention, the heating is effected in the extruder 10 at zones or regions which are substantially free from heat generated by friction by the interaction of the worm and the housing, while the compression and high-shear forces are provided in another extruder 50 whose worm 51 rotates in a housing 52 formed with a die 53 from which the shaped strand of synthetic resin is extruded at 54. A motor and gearing arrangement 55 drives the worm 51. Another funnel 60 (FIG. 1) can have a pressure-tight cover 61 and can be used to admit additional synthetic resin via the duct 62 into the housing 15 of the extruder 10.

Thus, as can be seen from the drawing, in the inlet funnel arrangement of an extruder at least two diametrically opposite electrodes can be provided for generating a high-frequency field. The granular synthetic resin is here preheated by the high-frequency heating.

Another electrode arrangement in the outlet region or the region of a die of the extruder can be provided for heating the melt to ensure homogeneity thereof before the melt is discharged from the extruder.

The arrangements described include an electrode arrangement for generating a high-frequency field between a metering device and the extruder and, indeed along a stretch in which the synthetic resin granulate passes the electrode device in free-fall as in the case of the duct 19. The electrodes can also be provided in an arrangement in which the plastic is forced past the high-frequency field as in the case of the decompression region 13. A number of metering stations can be provided along the plastifying worm and equipped with such electrode arrangements. The high-frequency field can also be used to drive volatile components from the plastic.

FIG. 1 shows a cascade arrangement of two extruders in which only the first extruder utilizes heating by means of high frequency, the second extruder serving for pressure buildup and discharge of the synthetic resin. The spaced-apart electrode arrangements can be provided at locally different flow regions to optimize the heat transfer to the synthetic resin. The different flow conditions can be a function of the selected geometry.

Additives can be supplied to the melt, e.g. through a separate inlet as shown at 60 in FIG. 1, to increase the high-frequency activity. In that case the additives should include substances which, for a given electrical energy, can bring about greater heating.

While all the electrode arrangements described can be used in various combinations and the desired heating can be controlled by regulating the high-frequency energization of the electrodes and the specific electrode arrangements, it is preferred that when three pairs of diametrically-opposite electrodes are provided, at least two be spaced by 120° from one another. While the frequency of the high-frequency field used will depend upon the type and structure of the plastic to be heated, in general, the high-frequency field will be in the kHz range or in the MHz or GHz range.

The method of the invention is especially applicable to plastics with large dipoles and particularly polyvinylchlorides, polyamides and polyoxymethyls although polyethylenes and polypropylenes are also suitable.

Figure 5:
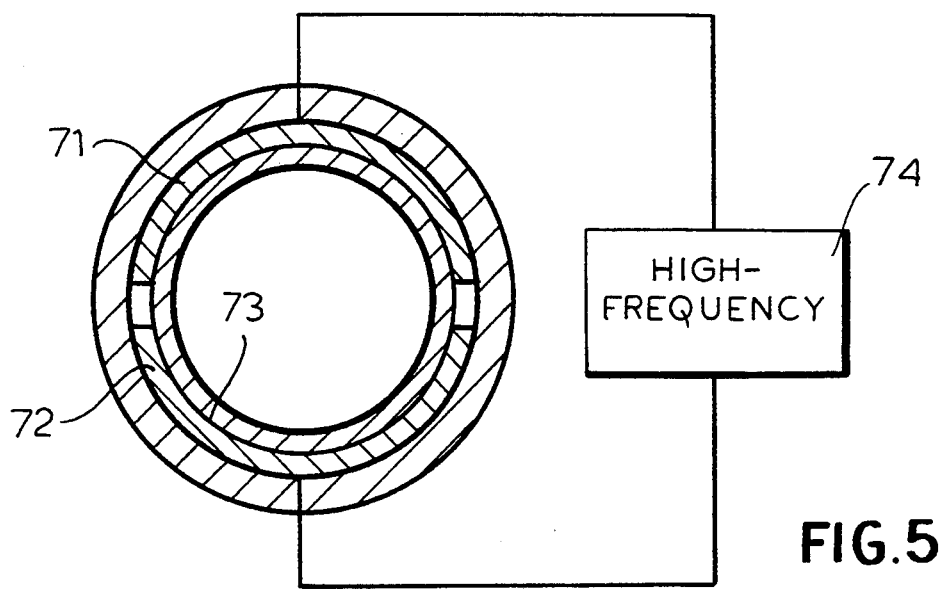
FIG. 5 is a cross sectional view taken along the line V—V through the outlet from the plastifying extruder to the mixing extruder.
Figure 6:
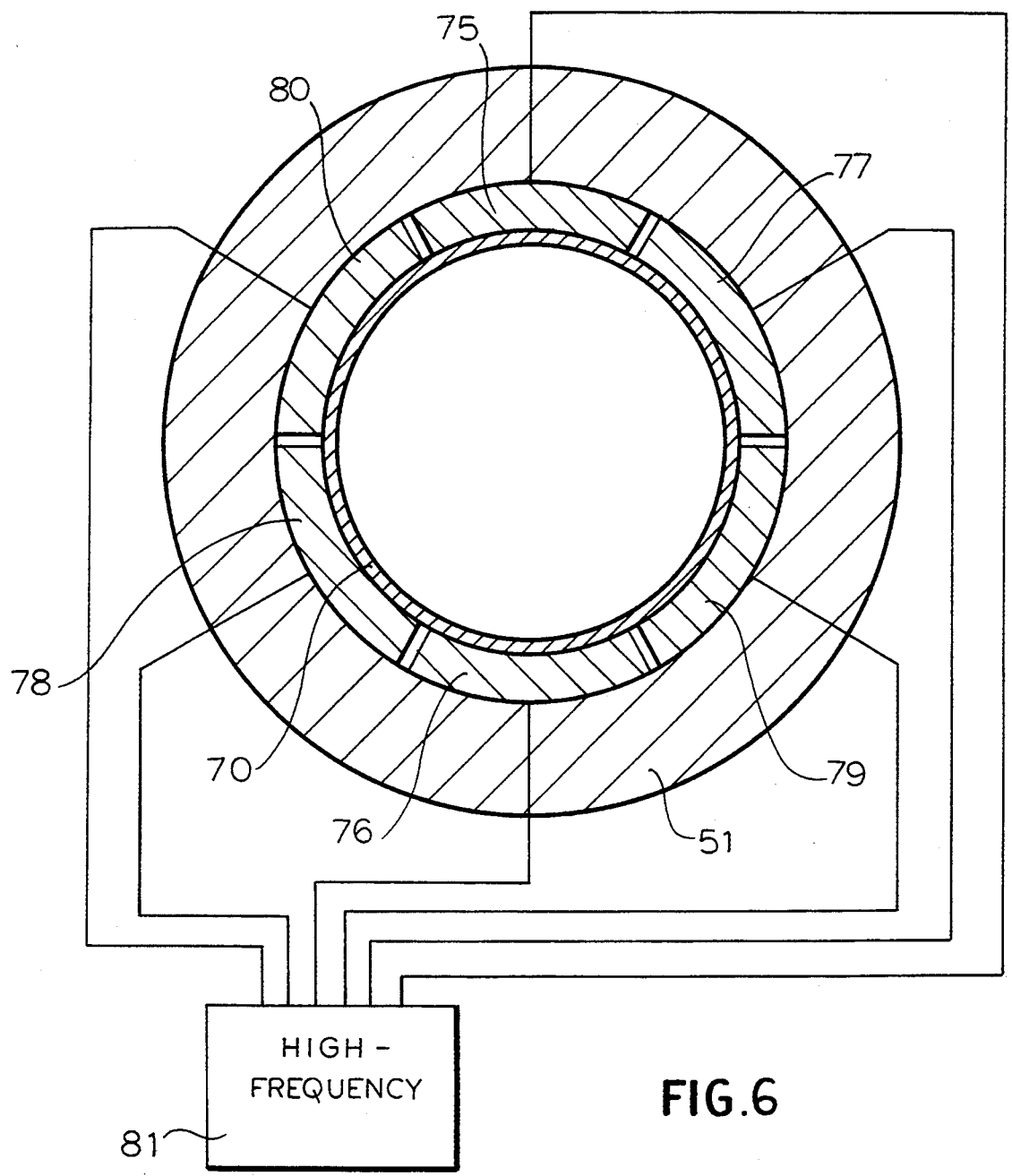
FIG. 6 is a cross sectional view taken along the line VI—VI at the outlet end of the mixing extruder.

As will be apparent from FIGS. 2 and 6, the inner wall 70 of the extruders should be smooth and cylindrical and free from discontinuities caused by the electrodes. In the regions free from the screws or worms, however, a smooth wall is not absolutely required. As can be seen from FIG. 5, at the outlet from the extruder 10 into the mixer 50, a pair of electrodes 71 and 72 can be provided inwardly of a smooth wall 73, if desired, and connected to the high-frequency source. FIG. 6 shows a high-frequency heater at the end of the mixing extruder 50 just before the synthetic resin enters the die 53. Here, six electrodes 75 and 76, 77 and 78 and 79 and 80 are provided in pairs of mutually-opposite polarity, energized by the high-frequency source with a rotating dielectric heating field in the manner described. Heating at this point by dielectric means is highly advantageous since it allows adjustment of the melt just before it is extruded to form the strand.

We claim:
1. A method of thermoplastifying a thermoplastic synthetic resin, said method comprising the steps of:
   (a) introducing a thermoplastifiable thermoplastic synthetic resin through a cylindricaliy tubular inlet region free from screw flights into an elongated screw housing containing at least one rotatable screw and advancing said synthetic resin along said housing through at least one cylindrically tubular intermediate region free from screw flights to a cylindrically tubular outlet region free from screw flights by rotation of said screw;
   (b) heating said synthetic resin by high frequency in a plurality of said regions by disposing at least one respective pair of dramatically opposite segmental electrodes at opposite sides of a tubular wall of said plurality of regions in contact with said resin and applying said high frequency across said opposite electrodes; and
   (c) limiting high frequency heating of said synthetic resin only to those of said regions at which the electrodes are provided and at which there is substantially no friction heat contributed to said synthetic resin by the interaction between said screw and said housing by confining the high frequency heating to said regions.

2. The method defined in claim 1 wherein said synthetic resin in subjected to high frequency heating both at said inlet region before said synthetic resin enters said housing and another of said regions including said intermediate region.

3. The method defined in claim 1 wherein high-frequency heating of said synthetic resin is effected by applying a pulsed high frequency field across electrodes spaced apart across a cross section of said housing.

4. The method defined in claim 1 wherein said high frequency heating of said synthetic resin is effected by providing a circular array of electrodes and energizing opposite electrodes with high frequency electricity of opposite polarity.

5. The method defined in claim 1 wherein one of said plurality of said regions is a decompression region, further comprising the step of decompressing said synthetic resin at said one of said plurality of said regions.

6. An apparatus for thermoplastifying a thermoplastic synthetic resin, comprising:
   an elongated screw housing containing at least one rotatable screw for thermoplastifying a synthetic resin and advance said synthetic resin from one end of said housing, through a cylindrical tubular intermediate region to another end of said housing;
   inlet means including a cylindrical tubular inlet region formed at said one end of said housing and communicating therewith for feeding synthetic resin to said housing;
   outlet means including a cylindrical tubular region at said other end of said housing for discharging thermoplastified synthetic resin, all of said regions being free from screw flights so that there is substantially no friction heat contributed to said synthetic resin by the interaction between said screw and said housing;
   a circular array of segmental diametrically opposite pairs of electrodes along cylindrical walls of a plurality of said regions, energizable by a high frequency to dielectrically heat said resin in contact with said electrode; and
   at least one polyphase source of high frequency connected across said pairs of electrodes for heating said resin.

7. The apparatus defined in claim 6 wherein at least one of the regions at which said array is provided for a decompression region in which said synthetic resin is decompressed.

8. The apparatus defined in claim 6 wherein said source is a source of pulsed high frequency.

* * * * *